US00RE50244E

(19) United States
(12) Reissued Patent
Newton et al.

(10) Patent Number: US RE50,244 E
(45) Date of Reissued Patent: *Dec. 24, 2024

(54) ELECTRONIC CIGARETTE WITH ENCODED CARTRIDGE

(71) Applicant: JUUL Labs, Inc., San Francisco, CA (US)

(72) Inventors: Kyle D. Newton, Southlake, TX (US); Daniel R. Brown, Fort Worth, TX (US)

(73) Assignee: JUUL Labs, Inc., Washington, DC (US)

( * ) Notice: This patent is subject to a terminal disclaimer.

(21) Appl. No.: 17/893,041

(22) Filed: Aug. 22, 2022

Related U.S. Patent Documents

Reissue of:
(64) Patent No.: 9,820,509
Issued: Nov. 21, 2017
Appl. No.: 14/051,122
Filed: Oct. 10, 2013

U.S. Applications:
(63) Continuation of application No. 16/691,574, filed on Nov. 21, 2019, now Pat. No. Re. 49,196, which is an application for the reissue of Pat. No. 9,820,509.

(51) Int. Cl.
*H05B 1/02* (2006.01)
*A24F 40/10* (2020.01)
(Continued)

(52) U.S. Cl.
CPC ..... *H05B 1/0244* (2013.01); *A24F 40/40* (2020.01); *A24F 40/53* (2020.01); *A24F 40/60* (2020.01); *A24F 40/10* (2020.01)

(58) Field of Classification Search
CPC ..... H05B 1/0244; A24F 40/53; A24F 40/40; A24F 40/60; A24F 40/10
See application file for complete search history.

(56) References Cited

U.S. PATENT DOCUMENTS 4,947,874 A 8/1990 Brooks et al.
4,947,875 A 8/1990 Brooks et al.
(Continued)

FOREIGN PATENT DOCUMENTS

AU 2017202891 B2 5/2019
CN 203337806 U 12/2013
(Continued)

OTHER PUBLICATIONS

Vranks, Smart Electronic Cigarette Tracks and Tweets Usage, Vape Ranks, TweetyCiggy Internet web page localed at http://vaperanks.com/smart-electronic-cigarette-tracks-and-tweets-usage/, Jul. 23, 2013, 3 Pages.

(Continued)

*Primary Examiner* — Norca L. Torres Velazquez
(74) *Attorney, Agent, or Firm* — Mintz Levin Cohn Ferris Glovsky and Popeo, P.C.

(57) ABSTRACT

An electronic cigarette with an atomizer cartridge and a battery assembly. The atomizer cartridge has an atomizer coupled to a first and second terminal of a cartridge interface. A passive electrical circuit is coupled between the first terminal and a sensing terminal. The battery assembly has an interface with a first, second, and sensing contact. The interface engages the cartridge interface to provide electrical continuity between the terminals and contacts. The battery assembly has an atomizer drive circuit connected between the first and second contact, and a controller that activates the atomizer drive circuit in response to negative pressure at a draw sensor. A sensing circuit coupled to the sensing contact outputs a parameter signal indicative of the electrical parameters of the passive electrical circuit. The controller activates an RGB LED to produce discrete colors of light corresponding to discrete values of the parameter signal.

9 Claims, 4 Drawing Sheets

(51) Int. Cl.

| | |
|---|---|
| ***A24F 40/40*** | (2020.01) |
| ***A24F 40/53*** | (2020.01) |
| ***A24F 40/60*** | (2020.01) |

(56) References Cited

U.S. PATENT DOCUMENTS

| | | | | |
|---|---|---|---|---|
| 5,060,671 | A | 10/1991 | Counts et al. | |
| 5,175,791 | A | 12/1992 | Muderlak et al. | |
| 5,372,148 | A | 12/1994 | McCafferty et al. | |
| 5,730,158 | A | 3/1998 | Collins et al. | |
| 7,167,776 | B2 | 1/2007 | Maharajh et al. | |
| 7,173,222 | B2 | 2/2007 | Cox et al. | |
| 7,726,320 | B2 | 6/2010 | Robinson et al. | |
| 7,802,569 | B2 | 9/2010 | Yeates et al. | |
| 7,913,688 | B2 | 3/2011 | Cross et al. | |
| 8,499,766 | B1 * | 8/2013 | Newton | A24F 47/002 131/273 |
| 8,528,569 | B1 | 9/2013 | Newton | |
| 8,714,150 | B2 | 5/2014 | Alelov | |
| 9,167,853 | B2 | 10/2015 | Xiang | |
| 9,385,554 | B2 | 7/2016 | Xiang | |
| 9,399,110 | B2 | 7/2016 | Goodman et al. | |
| 9,408,416 | B2 | 8/2016 | Monsees et al. | |
| 9,439,455 | B2 | 9/2016 | Alarcon et al. | |
| 9,455,579 | B2 | 9/2016 | Xiang | |
| 9,531,183 | B2 | 12/2016 | Xiang | |
| 9,560,882 | B2 | 2/2017 | Xiang | |
| 9,700,074 | B2 | 7/2017 | Liu | |
| 10,064,434 | B2 | 9/2018 | Zitzke et al. | |
| 10,834,964 | B2 | 11/2020 | Monsees et al. | |
| 2005/0016550 | A1 | 1/2005 | Katase | |
| 2006/0196518 | A1 | 9/2006 | Hon | |
| 2007/0267031 | A1 | 11/2007 | Hon | |
| 2008/0105257 | A1 | 5/2008 | Klasek et al. | |
| 2009/0095311 | A1 | 4/2009 | Han | |
| 2009/0192443 | A1 | 7/2009 | Collins, Jr. | |
| 2010/0031967 | A1 | 2/2010 | Inagaki | |
| 2012/0174914 | A1 * | 7/2012 | Pirshafiey | A61M 11/041 128/200.14 |
| 2012/0227753 | A1 * | 9/2012 | Newton | A24F 47/008 131/347 |
| 2012/0234821 | A1 | 9/2012 | Shimizu | |
| 2013/0306084 | A1 * | 11/2013 | Flick | A24F 47/008 131/328 |
| 2013/0312742 | A1 | 11/2013 | Monsees et al. | |
| 2013/0319440 | A1 | 12/2013 | Capuano | |
| 2014/0014126 | A1 * | 1/2014 | Peleg | A24F 47/008 131/329 |
| 2014/0020693 | A1 * | 1/2014 | Cochand | A61M 11/041 131/273 |
| 2014/0041658 | A1 | 2/2014 | Goodman et al. | |
| 2014/0053856 | A1 * | 2/2014 | Liu | A24F 47/008 131/329 |
| 2014/0123989 | A1 * | 5/2014 | LaMothe | A61M 15/0003 131/328 |
| 2014/0174459 | A1 * | 6/2014 | Burstyn | A24F 47/008 131/273 |
| 2014/0253144 | A1 * | 9/2014 | Novak, III | A24F 47/008 324/550 |
| 2014/0270727 | A1 * | 9/2014 | Ampolini | A24F 47/008 392/387 |
| 2014/0278250 | A1 | 9/2014 | Smith et al. | |
| 2014/0299137 | A1 | 10/2014 | Kieckbusch et al. | |
| 2014/0334804 | A1 | 11/2014 | Choi | |
| 2015/0027472 | A1 | 1/2015 | Amir | |
| 2015/0053214 | A1 | 2/2015 | Alarcon et al. | |
| 2015/0173124 | A1 * | 6/2015 | Qiu | A24F 47/008 131/328 |
| 2016/0192706 | A1 | 7/2016 | Kananen | |
| 2016/0204637 | A1 | 7/2016 | Alarcon et al. | |
| 2016/0226286 | A1 | 8/2016 | Xiang | |
| 2016/0242466 | A1 * | 8/2016 | Lord | G06F 1/3296 |
| 2016/0374398 | A1 | 12/2016 | Amir | |

FOREIGN PATENT DOCUMENTS

| | | | |
|---|---|---|---|
| CN | 103501847 | A | 1/2014 |
| CN | 105963833 | A | 9/2016 |
| EP | 3016233 | A1 | 5/2016 |
| EP | 3026779 | A1 | 6/2016 |
| EP | 2573900 | A1 | 3/2021 |
| KR | 200470584 | Y1 | 12/2013 |
| WO | WO-2014020953 | A1 | 2/2014 |
| WO | WO-2015035623 | A1 | 3/2015 |

OTHER PUBLICATIONS

TweetyCiggy Internet web page located at http://vaperanks.com/smart-electronic-cigarette-tracks-and-tweets-usage/.

* cited by examiner

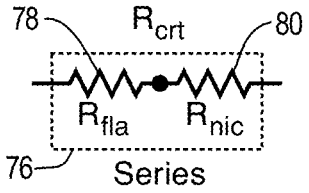
Fig. 6
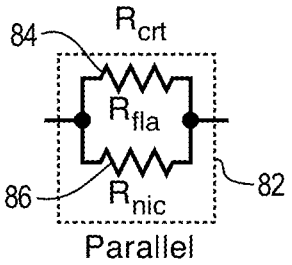
Fig. 7
92
90
96
| | | Nicotine Conc. $R_{nic}$ | | | |
|---|---|---|---|---|---|
| | | Non 1.0k | Low 1.5k | High 2.2k | LED Color |
| Flavor $R_{fla}$ | Tobacco 100 ohm | 90.9 1.10k | 93.8 1.60k | 95.7 2.30k | Amber |
| | Menthol 150 ohm | 130 1.15k | 136 1.65k | 140 2.35k | Green |
| | Blueberry 220 ohm | 180 1.22k | 192 1.72k | 200 2.42k | Blue |
| | Strawberry 330 ohm | 248 1.33k | 270 1.83k | 287 2.53k | Red |
| | Vanilla 470 ohm | 320 1.47k | 341 2.07k | 387 2.67k | Cream |
94
Parallel Series
Fig. 8

ELECTRONIC CIGARETTE WITH ENCODED CARTRIDGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*More than one reissue application has been filed for the reissue of U.S. Pat. No. 9,820,509. The reissue application is 17/893,041 (the present application), and 16/691,574 now, U.S. Pat. No. RE49,196, all of which are reissues of U.S. Pat. No. 9,820,509.*

*This application is a continuation of U.S. Reissue Pat. No. RE49,196, which issued on Aug. 30, 2022 and is entitled "ELECTRONIC CIGARETTE WITH ENCODED CARTRIDGE," filed on Nov. 21, 2019 as U.S. application Ser. No. 16/691,574 which is a reissue of U.S. Pat. No. 9,820,509, issued on Nov. 21, 2017, entitled "ELECTRONIC CIGARETTE WITH ENCODED CARTRIDGE" filed on Oct. 10, 2013 as U.S. application Ser. No. 14/051,122, the disclosures of which are incorporated herein by reference.*

BACKGROUND OF THE INVENTION

Field of the Invention

The present invention relates to electronic cigarettes. More specifically, the present invention relates to an electronic cigarette having a passive electric circuit in its atomizing cartridge, which is detected by a controller to determine the flavor and nicotine concentration of the atomizer cartridge.

Description of the Related Art

Electronic cigarettes have become increasingly popular in recent years. Electronic cigarettes emulate tobacco cigarettes, but without the combustion of tobacco during use. Rather than burning tobacco, a fluid is atomized within the electronic cigarette, which emulates the smoke produced in a tobacco cigarette. The fluid may contain flavoring agents such as tobacco flavor, menthol, fruits, herbs, and others, to enhance the "smoking" experience of the electronic cigarette. Nicotine is added to the atomization fluid at various concentrations. The atomizing fluid is commonly referred to a "e-liquid".

Electronic cigarettes typically contain two sections, a battery assembly and an atomizer cartridge. The battery assembly is typically an elongated tube, which has the appearance of the tobacco roll in a conventional cigarette. The atomizer cartridge typically has the appearance of the filter portion of a conventional cigarette. The atomizing cartridge contains the atomization fluid and atomizer, while the battery assembly contains the bulk of the remaining components including a rechargeable battery. Thus, the atomizer cartridge is the low-cost expendable portion, and the battery assembly is higher cost, but is reusable. Sometimes the atomizer cartridge is refillable, to a certain degree.

During use, users regularly replace the atomizer cartridge as the atomizing fluid is expended. Given that there are a variety of flavors and nicotine concentration to select from, users change both the flavor and concentration at will. This pattern of change presents issues and opportunities for enhancing the electronic cigarette experience. Thus, it can be appreciated that there is a need in the art for an electronic cigarette that enhances the user experience when selecting various flavors and nicotine concentration over time.

SUMMARY OF THE INVENTION

The need in the art is addressed by the apparatus of the present invention. The present invention teaches an electronic cigarette that includes an atomizer cartridge and a battery assembly. The atomizer cartridge includes an atomizer coupled to a first terminal and a second terminal of a cartridge interface. A passive two-terminal electrical circuit is coupled between the first terminal and a sensing terminal of the cartridge interface. The battery assembly includes an assembly interface with a first contact, a second contact, and a sensing contact. The assembly interface is adapted to engage the cartridge interface to supportively engage the atomizer cartridge to the battery assembly while providing electrical continuity between corresponding terminals and contacts. The battery assembly also includes an atomizer drive circuit that is coupled between the second contact and the first contact. It also includes a controller coupled to a draw sensor, which activates the atomizer drive circuit in response to negative pressure detected by the draw sensor. A sensing circuit is coupled to the sensing contact and the controller, and generates a parameter signal indicative of the electrical parameters of the passive two-terminal electrical circuit. The battery assembly also includes a multi-color light source coupled to the controller, such that the controller activates the multi-color light source to produce discrete colors of light corresponding to discrete values of the parameter signal.

In a specific embodiment of the foregoing apparatus, the sensing circuit is an analog to digital converter. In another specific embodiment, the sensing circuit comprises a bridge circuit. In another specific embodiment, the sensing circuit comprises an inductance, capacitance, and resistance meter.

In a specific embodiment of the foregoing apparatus, the passive two-terminal electrical circuit is a resistor. In a refinement to this embodiment, discrete values of the resistor correspond to discrete flavors of the atomizer cartridge.

In a specific embodiment of the foregoing apparatus, the passive two-terminal electrical circuit includes a first resistor and a second resistor. The first resistor indicates the flavor of the atomizer cartridge, and the second resistor indicates nicotine concentration of the atomizer cartridge. In a refinement to this embodiment, the first resistor and second resistor are wired in series. In another refinement, the first resistor and second resistor are wired in parallel.

In a specific embodiment, the foregoing apparatus further includes a second passive two-terminal electrical circuit disposed within the battery assembly, which is coupled between the second contact and the sensing contact.

In a specific embodiment of the foregoing apparatus, the passive two-terminal electrical circuit is a first resistor, and the apparatus further includes a second resistor in the battery assembly coupled between the sensing contact and the first contact, thusly forming a voltage divider circuit with the first resistor. Thusly, the sensing circuit is an analog to digital circuit that outputs a digital word having a value corresponding to the value of the first resistor.

In a specific embodiment of the foregoing apparatus, the multi-colored light source comprises plural light emitting diodes. In another specific embodiment, the multicolored light source is comprised of a red-green-blue light emitting diode.

In a specific embodiment, the foregoing apparatus further includes an actuator coupled to the controller, and the controller is responsive to actuation of the actuator to alter the discrete colors of light that are produced corresponding to the discrete values of the parameter signal. In a refinement to this embodiment, the discrete colors of light are altered to correspond with colors associated with each discrete flavor. In another refinement, the controller alters the discrete colors of light to be randomly selected upon each negative pressure detection by the draw sensor. In another refinement, the discrete colors of light are altered to be amber for all of the discrete values of the parameter signal. In another refinement, the discrete colors of light are altered to be blue for all of the discrete values of the parameter signal. In another refinement, the discrete colors of light are altered to be inactive for all of the discrete values of the parameter signal.

BRIEF DESCRIPTION OF THE DRAWINGS

FIG. 6 is a schematic diagram of a passive two-terminal electric circuit according to an illustrative embodiment of the present invention.

FIG. 7 is a schematic diagram of a passive two-terminal electric circuit according to an illustrative embodiment of the present invention.

FIG. 8 is a table showing the relationship of resistor value, flavor, and nicotine concentration in an electronic cigarette according to an illustrative embodiment of the present invention.

DESCRIPTION OF THE INVENTION

Figure 1:
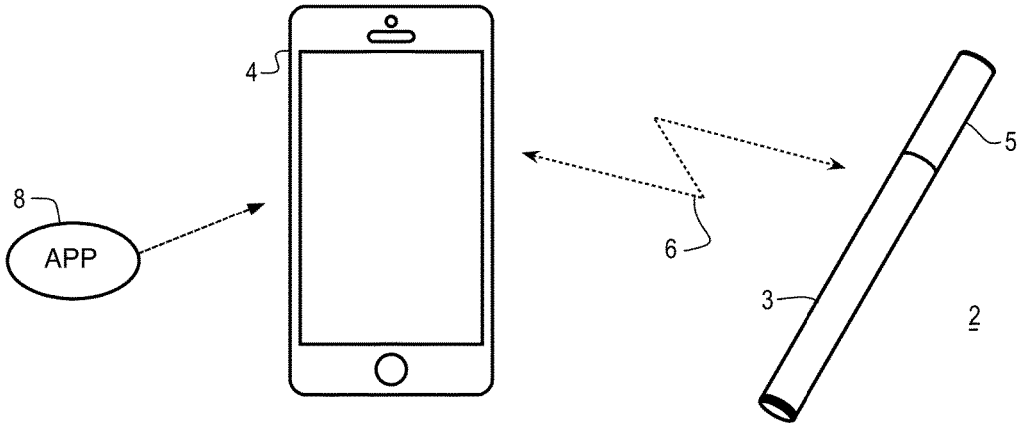
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The trends and usage of electronic cigarettes by users generates a flow of information, which could be monitored, processed, displayed, and accumulated to provide insightful information. This can be both current information, and prior usage information. As electronic cigarettes are used, the atomizer cartridge is replaced from time to time, and each replacement may be different in terms of flavor and nicotine content. During the use of each cartridge, there will be a finite number of puffs, each of specific duration. In addition, the battery reserve will be gradually depleted and require recharging from time to time. The present disclosure facilitates the gathering of such information by providing a passive two-terminal electrical circuit within the atomizer cartridge, which can be detected and measured by the battery assembly. More particularly, a controller is incorporated in the battery assembly to facilitate monitoring and gathering of consumption information. The controller also executes the functions of the electronic cigarette, such as detecting a draw on the mouthpiece, activating the atomizer, and monitoring consumption. Once gathered, this information can be used to extract usage trends for analysis and display.

An issue with accumulation, analysis and display of electronic cigarette information is the limited user interface of the typical electronic cigarette. While it would be possible to incorporate a more sophisticated user interface, such as a graphic display, this is probably not cost effective, nor particularly convenient for the user. The present disclosure teaches the use of a communications interface in the battery assembly so that the internal controller can communicate with an outside processor that has more complete user interface capabilities. For example, a serial interface to a personal computer. Thus, while the electronic cigarette is coupled to a personal computer, the information can be transferred, and then use for analysis and display. In another embodiment, a wireless communications interface is provided in the battery assembly, and thusly, wireless communications is enabled. For example, a Bluetooth radio, which communicates with a Smartphone running an application program ("APP"), can be incorporated into the electronic cigarette. With this embodiment, access to the information, processing, and display is enabled as a portable functionality.

Reference is directed to FIG. 1, which is a system diagram according to an illustrative embodiment of the present invention. The environment in which some of the illustrative embodiments of the present invention operate is an electronic cigarette 2 which is Bluetooth enabled, communicating with a wireless computing device 4, such as a Smartphone, tablet computer, or personal computer. Communications is via the wireless 6 Bluetooth protocol. The Smartphone 4 runs a application programs (hereinafter "APP") 8 which embodies the functionality described hereinafter. Note that the electronic cigarette is comprised of an atomizer cartridge 5 and a battery assembly 3.

Figure 2:
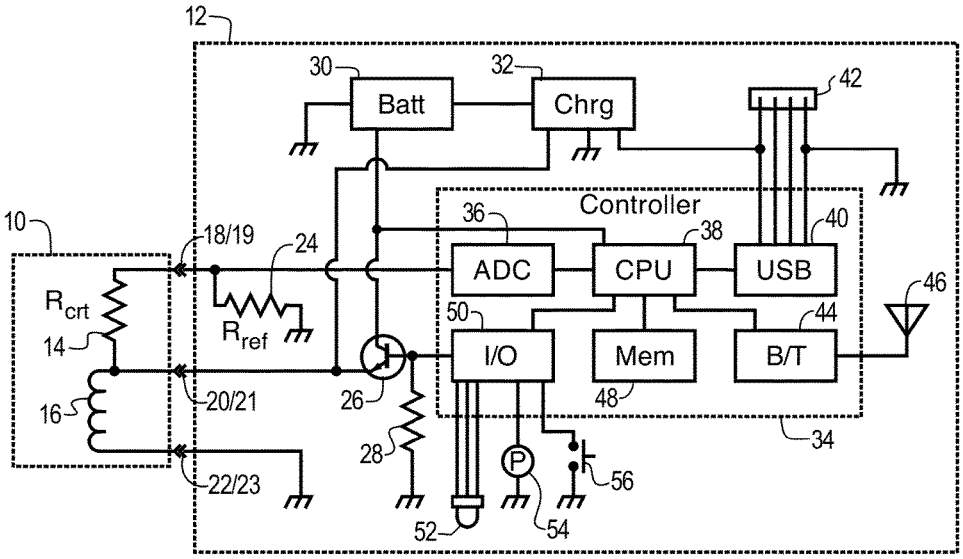
FIG. 2 is a schematic diagram according to an illustrative embodiment of the present invention.

Reference is directed to FIG. 2, which is a schematic diagram of an electronic cigarette according to an illustrative embodiment of the present invention. This embodiment comprises circuitry for an atomizer cartridge portion 10 and a battery assembly portion 12. Note that the battery assembly 12 is reusable and the atomizer cartridge 10 is disposable. Therefore, the circuitry incorporated into the atomizer 10 is kept to a bare minimum. This includes the atomizer 16 and a passive two-terminal electrical circuit 14, which are connected to the battery assembly 12 through three terminal/contact pairs 18/19, 20/21, and 22/23. In this embodiment, the passive two-terminal electrical circuit 14 is a resistor, referred to here as $R_{crt}$ (R-cartridge). Other discrete components, such as inductors and capacitors could also be employed, as well as networks of passive components. In essence, that battery assembly 12 detects or measures the parameter values of the passive two-terminal electrical circuit 14, and this information is correlated to the electronic cigarette fluid (hereinafter e-liquid) that is vaporized by the atomizer 16. Each discrete value of these parameters is mapped to specific e-liquid. For example, a 470 ohm resistor could be mapped to a menthol e-liquid cartridge that has low nicotine concentration.

Note that the interface between the atomizer cartridge 10 and battery assembly 12 comprises three terminal/contact pairs 18/19, 20/21/ and 22/23 in FIG. 2. A first pair 22/23 is connected to the common ground, which would likely be the negative terminal of the power supply. Positive grounded circuit designs could also be employed. The second terminal 20/21 is the drive voltage to the atomizer 16, which has power applied at the time a user draws a puff of vapor from the atomizer cartridge 10. Note that the voltage potential at this terminal 20/21 is generally near the power supply positive voltage as a puff is drawn, so it provides the supply voltage to the atomizer cartridge 10. This supply voltage at terminal 20/21 is also connected to the resistor 14, and the other end of the resistor is connected to terminal 18/19, which is referred to as the sensing terminal, since this is the reference point for the battery assembly 12 to measure the electrical parameter of the passive two-terminal electrical circuit 14. Since the power at terminal 20/21 is only present during the draw of a puff, which is when the atomizer 16 is energized, this is a time at which the parameters of the passive two-terminal electrical circuit can be measured.

The circuitry within the battery assembly 12 is coupled to the atomizer cartridge through three contacts, labeled 19, 21, and 23 in FIG. 2, as was discussed above. In this embodiment, the parameters of the cartridge resistor 14 are measure by forming a voltage divider circuit with a reference resistor ($R_{ref}$) 24 in the battery assembly 12. This resistor 24 is coupled between contact 19 and ground. Since the cartridge resistor 14 is drawn up to battery voltage through terminal 20/21 at the time a puff is taken, the voltage divider arrangement is perfected. An analog to digital converter (hereinafter "ADC") 36 senses the voltage at contact 19, and this value is converted to a digital word, which is fed to a central processing unit (hereinafter "CPU") 38 for analysis and subsequent actions. Since the value of $R_{ref}$ 24 is known, as well as the supply voltage, the resistance parameter of $R_{crt}$ 14 is readily calculated. Note that this embodiment utilizes a voltage divider and ADC 36 to measure the resistance parameter. In other embodiments where reactive passive devices are employed, their respective parameters can be measure using techniques that measure inductance and capacitance using various types of LCR metering circuits, as are known to those skilled in the art. In addition, tank circuits can be used to oscillate and LR circuit to measure reactive parameters, and bridge circuits can be used to enhance accuracy of the parameter measurement if needed. This is sometimes useful where there are a great number of mapped flavors and nicotine levels. In some embodiments, that number can be fifty or more.

In the illustrative embodiment of FIG. 2, the battery assembly 12 circuitry is based on an integrated device, which provides a host of circuits, including the ADC 36, the CPU 38, and USB controller 40, a range of input and output circuits 50 (hereinafter I/O), memory 48, in the form of RAM and Flash memory, a Bluetooth interface and radio 44, as well of various other conventional controller circuitry. This controller 34 is a Texas Instruments, Inc. (Dallas, Tex., USA; www.ti.com) model CC2540F128 (or 256) 2.4 GHz Bluetooth Low Energy System-on-Chip integrated controller. This device fits a 6 mm square package with can fit into and meet power constraints of an electronic cigarette. Very little other peripheral circuitry is required. The atomizer 16 drive circuit 26 is a suitable semiconductor switch device that can switch approximately one ampere at four volts, and which can be driven by a logical output 50 of the controller 34. In the Figure, a bipolar transistor is shown, but any suitable switching device could be employed.

With respect to the other peripheral circuitry in FIG. 2, the controller I/O circuits 50 are connected to a momentary contact actuator 56 for accepting user inputs. It is also coupled to a pressure sensor 54, which detects the negative pressure within the battery assembly 12 at the time a user draws a puff from the electronic cigarette. In addition a red-green-blue, or red-green-blue-white, light emitting diode (hereinafter RGB LED) 52, which functions as a multi-color light source for outputting information to the user, it coupled to the I/O circuits 50. The Bluetooth radio 44 is couple to an antenna 46, which may be a trace on a host circuit board (not shown). A USB interface connector 42 is disposed at the tip end of the battery assembly 12, which services two functions. First, it provides an interface for connecting USB power from another source to charge the internal battery 30 of the battery assembly 12. Second, it provides an additional serial interface to an external computing device, such as a personal computer, to support all the functions that are available using the Bluetooth interface 44. The battery charging function is managed by a conventional battery charging circuit 32.

Figure 3C:
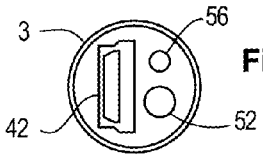
FIGS. 3A, 3B, and 3C are a section view, end view, and tip view drawing, respectively, of a battery assembly according to an illustrative embodiment of the present invention.
Figure 3A:
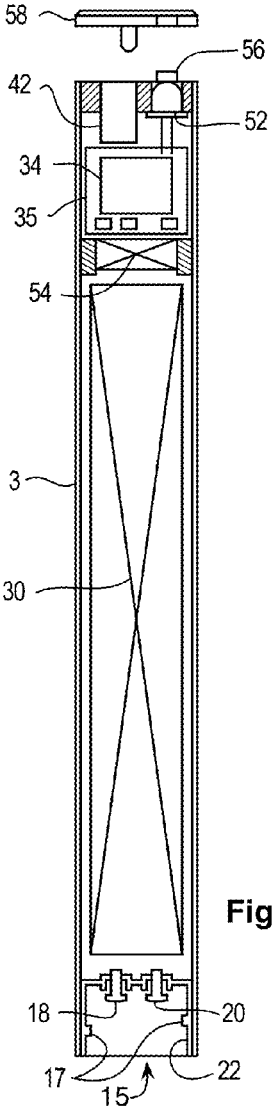
Figure 3B:
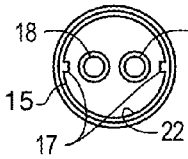
Figure 4C:
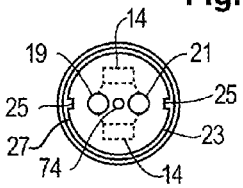
FIGS. 4A, 4B, 4C, and 4D are a section view, end view, mouthpiece view, and detailed view drawing, respectively, of an atomizer cartridge according to an illustrative embodiment of the present invention.
Figure 4A:
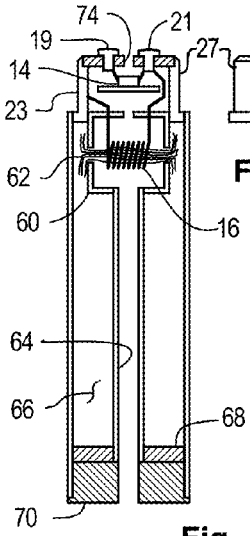
Figure 4D:
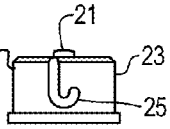
Figure 4B:
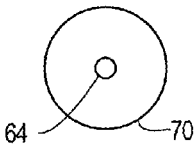

Reference is directed to FIGS. 3A, 3B, and 3C, which are a section view, end view, and tip view drawing, respectively of a battery assembly 3 according to an illustrative embodiment of the present invention. The battery assembly 3 is an elongated cylinder generally resembling the tobacco roll of a conventional cigarette. The bulk of the internal volume is filled with a lithium polymer battery 30, which provides power to the assembled electronic cigarette. The primary power consuming function is energizing the atomizer (not shown), which draws about one ampere at the 3.7 volt (nominal) battery voltage. In addition, the battery 30 powers the controller 34 and related circuitry. This circuitry is primarily located at the tip end, which is distal to the battery assembly interface 15. At the tip end, there is located a USB physical interface connector 42, an RGB LED 52, and a momentary contact actuator 56, all of which are connected to the processor printed circuit board 35. A translucent cap 58 engages the USB interface 42 with a friction fit, and is fabricated from a resilient and translucent material. This enables light from the RGB LED 52 to pass to the exterior for viewing by a user. The resilience enables the user to actuate the actuator 56 while the cap 58 is in place on the tip end of the battery assembly 3. A pressure sensor 54 is positioned near the controller circuit board. The pressure sensor 54 is a diaphragm type sensor that senses negative pressure within the battery assembly that occurs when a user draws a puff from the assembled electronic cigarette.

The battery assembly interface 15 provides an electrical and supportive physical interface to the atomizer cartridge (not shown). There are three electrical conductors in the interface sleeve 22, which provides the electrical interface for the common (ground) connection, and two central contacts 18, 20. The central contacts 18, 20 connect to the atomizer and the passive two-terminal electrical circuit, as was discussed hereinbefore. The physical interface 15 includes a pair of non-symmetrical inwardly pointing bayonet pins 17, which engage the atomizer cartridge (not shown).

Reference is directed to FIGS. 4A, 4B, 4C, and 4D, which are a section view, end view, mouthpiece view, and detailed view drawing, respectively, of an atomizer cartridge 5 according to an illustrative embodiment of the present invention. The atomizer cartridge 5 has the general appearance and proportions of a filter on a conventional tobacco cigarette. An atomizer 16 is disposed within and atomizing chamber 60, which is coupled to a mouthpiece 70 by a chimney 64. The chimney 64 is sealed to the mouthpiece 70 using a resilient seal 68. The annular space 66 between the chimney 64 and the atomizer cartridge 5 housing defines an e-liquid reservoir. The e-liquid stored in the reservoir 66 enters the atomizing chamber 60 an atomizer 16 via a wick 62. While the atomizer coil 16 is energized, it produces heat that vaporizes the e-liquid to produce the desired vapor.

A cartridge interface 27 provides for the electrical and physical interface to the battery assembly (not shown). The electrical interface includes the outer metallic portion, or terminal, 23, and two centrally located terminals 19, 21. The outer terminal 23 is the common ground that connects to the atomizer 16, and the central terminals 19, 21 connect to the atomizer 16 and the passive two-terminal electrical circuit 14, which is a pair of resistors wired in parallel in this embodiment. A central passage 74 is formed through the cartridge interface 27, which serves to couple the negative pressure of a draw to the battery assembly (not shown). A pair of J-shaped bayonet groves 25 are formed on either side of the interface 27, which serves to engage, align, and retain the assembly interface (not shown) of the battery assembly (not shown).

Figure 5:
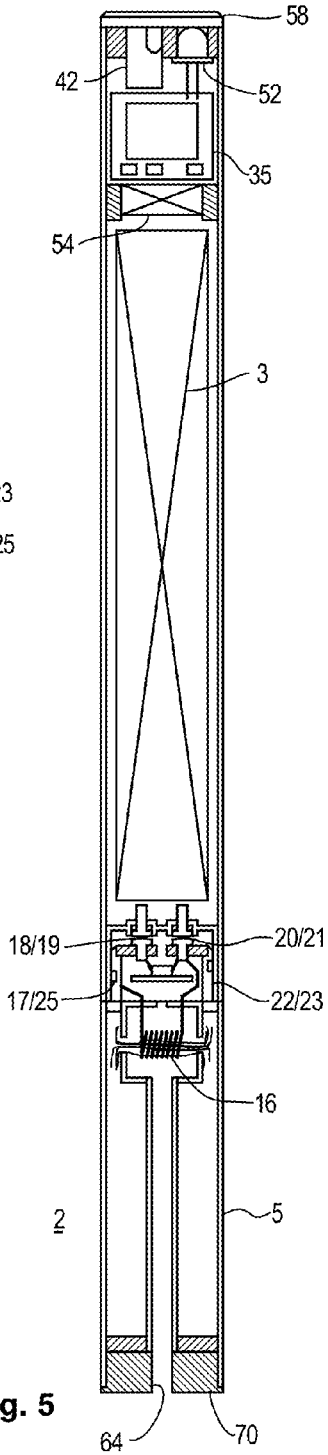
FIG. 5 is a section view drawing of an electronic cigarette according to an illustrative embodiment of the present invention.

Reference is directed to FIG. 5, which is a section view drawing of an electronic cigarette 2 according to an illustrative embodiment of the present invention. The electronic cigarette 2 includes an atomizer cartridge 5 and a battery assembly 3, which correspond to those discussed in FIG. 3 and FIG. 4. In FIG. 5, the atomizer cartridge 5 and battery assembly 3 have been engaged together. Note that the terminal and contact pairs 18/19, 20/21/ and 22/23 make electrical contact, while the bayonet pins 17 engage the bayonet J-groves 25. Also note that the battery assembly contacts 18 and 20 are resiliently mounted to compress as the bayonet pins 17 ride over the J-groves 25, and maintain an electrical connection. The translucent cap 58 is engaged with the USB connector 42, such that the RGB LED 52 light passes through the translucent material. In operation, the user draws a puff from the mouthpiece 70, which is pneumatically communicated through the chimney 64. The pressure sensor 54 senses the draw, and the controller circuitry 35 activates he atomizer 16, which vaporizes some of the e-liquid for the desired vapor production. At the same time, the controller circuitry 35 illuminates the RGB LED in a color that corresponds to a user selection, which will be more fully discussed hereinafter.

Reference is directed to FIG. 6, which is a schematic diagram of a passive two-terminal electric circuit 76 according to an illustrative embodiment of the present invention. In this illustrative embodiment, the passive two-terminal electric circuit 76 is comprised of resistance parameters only. More particularly, two resistors 78, 80 wired in series. The value of the first resistor 78, which is the flavor indication ($R_{fla}$), is selected to correspond with the flavor of the e-liquid in the atomizer cartridge. The value of the second resistor 80, which is the nicotine concentration indication ($R_{nic}$), is selected to correspond with the concentration of nicotine in the e-liquid in the atomizer cartridge.

Reference is directed to FIG. 7, which is a schematic diagram of a passive two-terminal electric circuit 82 according to an illustrative embodiment of the present invention. In this illustrative embodiment, the passive two-terminal electric circuit 82 is comprised of resistance parameters only. More particularly, two resistors 84, 86 wired in parallel. The value of the first resistor 84, which is the flavor indication ($R_{fla}$), is selected to correspond with the flavor of the e-liquid in the atomizer cartridge. The value of the second resistor 86, which is the nicotine concentration indication ($R_{nic}$), is selected to correspond with the concentration of nicotine in the e-liquid in the atomizer cartridge.

Reference is directed to FIG. 8, which is a table showing the relationship of resistor value, flavor, and nicotine concentration in an electronic cigarette according to an illustrative embodiment of the present invention. This figure illustrates component values for two embodiments of resistive parameter passive two-terminal electrical circuits for series and parallel wiring, which correspond to those illustrated in FIG. 6 and FIG. 7. Note that the table in FIG. 8 is divided into four sections, labeled 90, 92, 94, and 96. Section 90 establishes the flavor and resistor ($R_{fla}$) value correlation, which are 100 ohm for tobacco, 150 ohm for menthol, 220 ohm for blueberry, 330 ohm for strawberry, and 470 ohm for vanilla. Section 92 establishes the nicotine concentration and resistor ($R_{nic}$) value correlation, which are 1.0 kohm for no nicotine, 1.5 kohm for low nicotine concentration, and 2.2 kohm for high nicotine. Section 94 is a table of calculated values for the parallel and series networks for the aforementioned resistors. The parallel calculated values are on the top of each cell, and series calculated values are at the bottom of each cell. Note that the resistor values for both the parallel and series combinations result in unique discrete network parameters for every possible combination. This is significant, because it enables the sensing circuit (not shown) to uniquely identify all of the possible combinations of resistor values. More importantly, it enables a manufacturer of such atomizer cartridges to assign the flavor and nicotine resistor values, and then produce whatever combinations of flavors and concentrations the market may demand without having to alter components values on an ad hoc basis. This table would be stored in the memory of the controller (not shown) and is used as a reference to the measure parameter value taken at each puff, thereby informing the controller of the flavor and nicotine concentration of every puff. Finally, the table section 96 presents the corresponding LED color assigned to each flavor, which in this embodiment are amber for tobacco flavor, green for menthol flavor, blue for blueberry flavor, red for strawberry flavor, and cream (off-white) for vanilla flavor. During operation, when a particular flavor is identified at the initial of each puff, the controller illuminates the RGB LED in the corresponding color.

Figure 9:
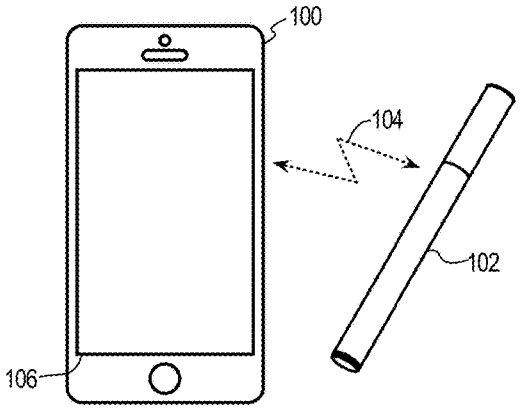
FIG. 9 is a system diagram according to an illustrative embodiment of the present invention.

Reference is directed to FIG. 9, which is a system diagram according to an illustrative embodiment of the present invention. An electronic cigarette 102, which is Bluetooth enabled, communicates with a Smartphone 100. Communications is via the wireless 104 Bluetooth protocol. The Smartphone 100 runs an application program (hereinafter "APP"), which embodies the functionality described herein. The display and touch screen 106 of the Smartphone are employed as the user interface for the APP. The APP communicates with the electronic cigarette 102 and can read the data that has been collected by the controller therein (not shown). The APP can also control functionality of the electronic cigarette 102, to tailor the operation to the user's reference.

Figure 10:
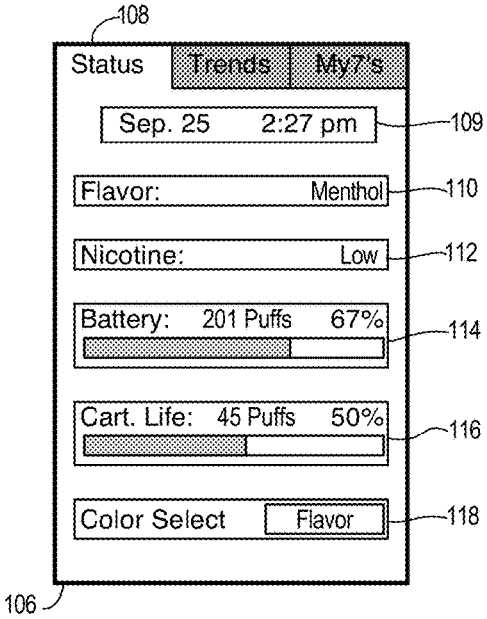
FIG. 10 is a Smartphone APP display screen according to an illustrative embodiment of the present invention.

Reference is directed to FIG. 10, which is a Smartphone APP display screen 106 according to an illustrative embodiment of the present invention. The APP program of the illustrative embodiment includes three display presentations, and this figure illustrates the "Status" display 108 section. The Status 108 section presents the current operating status of the connected electronic cigarette. Note that the first field 109 is for date and time. That date and time data in the electronic cigarette are synchronized from the network time available in the Smartphone. It is useful to maintain date and time 109 in the electronic cigarette so that time based activities can be monitored. The next field in the Status display 108 is the Flavor field 110, which presents the current atomizer cartridge flavor, Menthol in this example. This information is transferred to the APP from the controller in the electronic cigarette, which obtained it by sensing the passive two-terminal electrical circuit value in the most recent puff taken by the user. Similarly, the next field 112 displays the Nicotine concentration value 112 for the most recent puff, which is "Low" in this example. Thus, the user can confirm the current atomizer cartridge flavor and nicotine concentration through the Status display 108 of the APP in their Smartphone 100. Note that wile nicotine concentrations of "None", "Low", and "High" are discussed in the illustrative embodiment, specific chemical concentration could also be presented.

The next display field in FIG. 10 is the Battery status field 114. This presents the remaining battery life, which is 67% in this example. This field also calculates the number of puffs that the remaining battery life can sustain, which is 201 puffs in this example. The calculation can be based on a fixed determinate, such as 300 puffs for a fully charged battery. Or, if use history has been accumulated, then the number of puffs per battery charge can be more accurately determined and presented. As was noted hereinbefore, atomizer operations is the largest power drain on the battery. This means that the duration of each puff greatly influence the number of puffs a battery can support. Some users will take brief puffs, perhaps one second in duration. Other users may draw longer puffs, perhaps as long as three seconds. Thus the battery life, in terms of the number of puffs, will be different by a factor of three between these two users. Thus, accumulating usage information for each battery assembly improves the prediction of expected life of the various components.

The next display field in FIG. 10 is the Cartridge Life field 116, which shows 50% puffs remaining in this example. This field also calculates the number of puffs estimated to remain in the present atomizer cartridge, which is 45 puffs in this example. The calculation can be based on a fixed determinate, such as 90 puffs for a new atomizer cartridge. Or, if use history has been accumulated, then the number of puffs per cartridge can be more accurately determined and presented. The duration of each puff greatly influence the number of puffs a single cartridge can provide. Some users will take brief puffs, perhaps one second in duration. Other users may draw longer puffs, perhaps as long as three seconds. Thus the cartridge life, in terms of the number of puffs, will be different by a factor of three between these two users. Thus, accumulating usage information for each atomizer cartridge improves the prediction of its expected life.

The last Status field in FIG. 10 is the Color Selection field 118. In this illustrative embodiment, the user can select between various implementations of the RGB LED display operation on each puff. This selection ca be made using the actuator at the tip end of the electronic cigarette, or it can be made in this field 118 of the APP. In the illustrative embodiment, the choices offered are for the puff color to match the flavor, for the puff colors to be generated randomly by the controller, for the puff color to always be amber, for the puff color to always be blue, or for the RGB LED to remain inactive, in a so called stealth mode. Also, this field 118 also informs the user what the currently selected color mode is.

Figure 11:
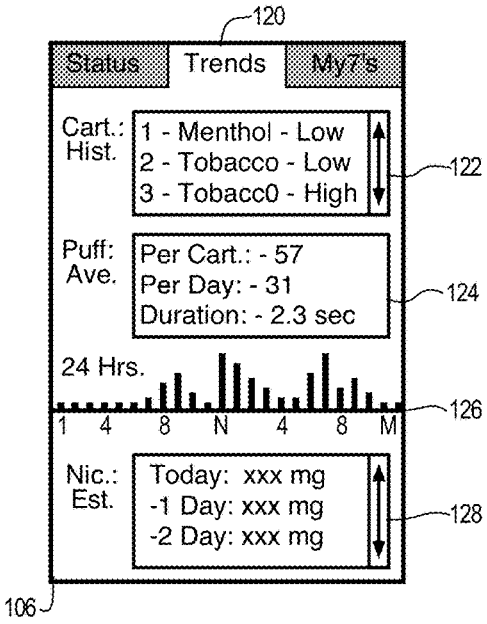
FIG. 11 is a Smartphone APP display screen according to an illustrative embodiment of the present invention.

Reference is directed to FIG. 11, which is a Smartphone APP display screen 106 according to an illustrative embodiment of the present invention. In this figure, the Trends tab 120 has been selected, which causes the APP to present historic usage information for review by the user. The first field is the Cartridge History field 112, which tabulates a list of cartridges utilized by the user in chronological order. A scroll bar is provided to enable display of lists longer that the screen 106 will allow. Note that this information is gathered by the controller in the electronic cigarette and is transferred to the APP when the Bluetooth link is made. This information is insightful to the user, but is also useful in determining usage trends, targeted marking, automated ordering, and usage transitioning encouragement.

The next field in the Trends 120 display of FIG. 11 is the Puff Average field 124. This field tabulates prior usage information, and calculates trends, that have been transferred to the APP from a connected electronic cigarette. Certain calculations are done within the APP so that the information can be presented in fashion useful to the user. The unit of information is the number of puffs per cartridge, which is 57-puffs in this example. Next, is the number of puffs per day, which is 31-puffs in this example. Finally, the average duration of each puff is presented, which is 2.3 seconds per puff in this example. Note that this information is calculated from raw data gathered by the electronic cigarette. Thus, the cigarette records each puff taken, the time at which it is taken, and the duration of each, as well as the flavor and nicotine concentration. With this data, all of these "trends" can be calculated.

The next field in the Trends 120 display of FIG. 11 is that 24-Hour puffs histogram 126. This is a graphical display of the number of puffs taken during each hour of a 24-hour period. With this information, the user can appreciate the time-of-day usages, and make adjustments to consumption if desired. The final Trends 120 field is the Nicotine Estimate area 128. This field 128 lists the estimated nicotine consumed each day, based on the nicotine concentration, number of puffs, and duration of puffs. With this information, the user can estimate trends in nicotine consumption, and make informed choices about cartridge nicotine strength, number of puffs to take, as well as puff duration.

Figure 12:
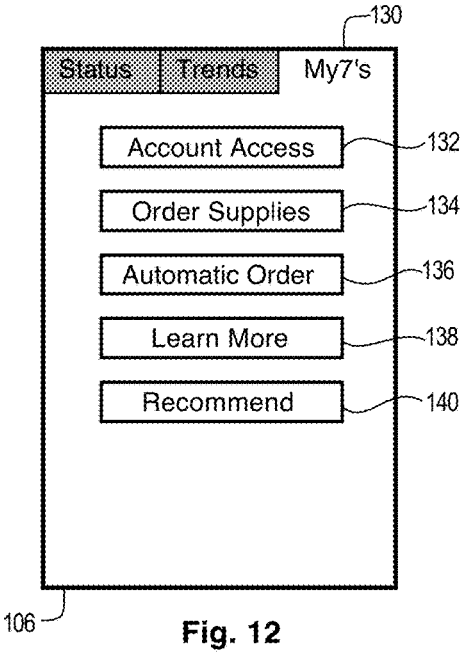
FIG. 12 is a Smartphone APP display screen according to an illustrative embodiment of the present invention.

Reference is directed to FIG. 12, which is a Smartphone APP display screen 106 according to an illustrative embodiment of the present invention. This figure illustrates the user's account information 130, which is for the 7's® brand of electronic cigarettes in the illustrative embodiment. This display provides user access to advanced services, including access to their on-line account 132, A link to ordering additional electronic cigarette supplies 134, and automatic reordering feature 132, education resources 138, and a product recommendation tool 140, all of which are hosted by the supplier's Internet web sight that is accessed through the host Smartphone and APP.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

[1. An electronic cigarette apparatus, comprising:

an atomizer cartridge, further comprising;

a cartridge interface having three electrical terminals, consisting of a first terminal, a second terminal, and a sensing terminal;

an atomizer coupled to said first terminal and a said second terminal of a said cartridge interface;

a first resistor, coupled between said first terminal and a said sensing terminal of said cartridge interface, and a battery assembly, further comprising;

an assembly interface having a first contact, a second contact, and a sensing contact, and adapted to engage said cartridge interface to supportively engage said atomizer cartridge to said battery assembly while providing electrical continuity between corresponding terminals and contacts;

a second resistor disposed within said battery assembly and coupled between said sensing contact and said second contact, thusly forming a voltage divider circuit with said first resistor;

an atomizer drive circuit coupled between said second contact and said first contact;

a controller coupled to a draw sensor, and operable to activate said atomizer drive circuit in response to negative pressure detected by said draw sensor;

a sensing circuit coupled to said sensing contact and said controller, which generates a parameter signal indicative of a divided voltage at said sensing contact that results from said voltage divider circuit formed by said first resistor and said second resistor;

a multi-color light source coupled to said controller, and wherein said controller activates said multi-color light source to produce discrete colors of light corresponding to discrete values of said divided voltage.]

[2. The apparatus of claim 1, and wherein:

said sensing circuit is an analog to digital converter.]

[3. The apparatus of claim 1, and wherein:

said sensing circuit comprises a bridge circuit.]

[4. The apparatus of claim 1, and wherein:

said sensing circuit comprises an inductance, capacitance, and resistance meter.]

[5. The apparatus of claim 1, and wherein:

discrete values of said first resistor and said second resistor correspond to discrete flavors of said atomizer cartridge.]

[6. The apparatus of claim 1, and wherein:

said first resistor indicates the flavor of said atomizer cartridge, and said second resistor indicates nicotine concentration of said atomizer cartridge.]

[7. The apparatus of claim 1, and wherein:

said sensing circuit is an analog to digital circuit that outputs a digital word having a value corresponding to the value of said divided voltage.]

[8. The apparatus of claim 1, and wherein:

said multi-colored light source comprises plural light emitting diodes.]

[9. The apparatus of claim 1, and wherein:

said multicolored light source is comprised of a red-green-blue light emitting diode.]

[10. The apparatus of claim 1, further comprising:

an actuator coupled to said controller, and wherein said controller is responsive to actuation of said actuator to alter said discrete colors of light that are produced corresponding to said discrete values of said divided voltage.]

[11. The apparatus of claim 10, and wherein:

said discrete colors of light are altered to correspond with colors associated with each discrete flavor.]

[12. The apparatus of claim 10, and wherein:

said controller alters said discrete colors of light to be randomly selected upon each negative pressure detection by said draw sensor.]

[13. The apparatus of claim 10, and wherein: said discrete colors of light are altered to be amber for all of said discrete values of said divided voltage.]

[14. The apparatus of claim 10, and wherein: said discrete colors of light are altered to be blue for all of said discrete values of said divided voltage.]

[15. The apparatus of claim 10, and wherein:

said discrete colors of light are altered to be inactive for all of said discrete values of said divided voltage.]

*16. An electronic cigarette apparatus, comprising:*

*an atomizer cartridge, comprising:*

*a cartridge interface comprising a first terminal, a second terminal, and a sensing terminal;*

*an atomizer comprising a cartridge resistor coupled to the first terminal of the cartridge interface; and*

*a battery assembly, comprising:*

*an assembly interface comprising a first contact, a second contact, and a sensing contact, the assembly interface configured to engage with the cartridge interface to supportively engage the atomizer cartridge with the battery assembly while providing electrical continuity between corresponding terminals and contacts;*

*a reference resistor disposed within the battery assembly, the reference resistor coupled between the sensing contact and the second contact to form a voltage divider circuit with the cartridge resistor;*

*an atomizer drive circuit coupled between the first contact and the second contact;*

*a controller coupled to a draw sensor, the controller configured to activate the atomizer drive circuit in response to the draw sensor detecting a negative pressure; and*

*a sensing circuit coupled to the sensing contact and the controller, the sensing circuit configured to detect, at the sensing contact, a divided voltage from the voltage divider circuit, and generate a parameter signal indicative of the divided voltage.*

*17. The electronic cigarette apparatus of claim 16, wherein the controller is further coupled to a wireless interface and radio for communicating with an application at a mobile device.*

*18. The electronic cigarette apparatus of claim 17, wherein at least a portion of data collected by the controller is sent to the application via the wireless interface and radio, and wherein the application controls, based on at least the portion of the data, one or more functionalities of the apparatus.*

*19. The electronic cigarette apparatus of claim 18, wherein the data includes one or more of a flavor of the atomizer cartridge, a nicotine content of the atomizer cartridge, a quantity of puffs associated with the atomizer cartridge, and a duration of each puff associated with the atomizer cartridge.*

*20. The electronic cigarette apparatus of claim 18, wherein the data includes a first usage data associated with a first atomizer cartridge currently coupled with the apparatus and/or a second usage data associated with a second atomizer cartridge previously coupled with the apparatus.*

*21. The electronic cigarette apparatus of claim 18, wherein the application includes a user interface displaying at least a result of the application analyzing at least the portion of the data.*

*22. The electronic cigarette apparatus of claim 17, wherein the wireless interface and radio operate in accordance with a Bluetooth protocol or a Bluetooth Low Energy (BLE) protocol.*

*23. The electronic cigarette apparatus of claim 16, further comprising:*

*a multi-color light source coupled with the controller, the controller activating the multi-color light source to produce one or more colors of light corresponding to one or more values of the divided voltage.*

*24. The electronic cigarette apparatus of claim 16, wherein the divided voltage corresponds to a parameter of the cartridge resistor.*

* * * * *